United States Patent
Lasky et al.

[19]

[11] Patent Number: 5,817,504
[45] Date of Patent: Oct. 6, 1998

[54] METHOD AND APPARATUS FOR ACCELERATED DECOMPOSITION OF PETROLEUM AND PETRO-CHEMICAL BASED COMPOUNDS WITHIN FILTER MEDIA

[75] Inventors: William M. Lasky, Charlotte; James H. Cornwell, Wilmington, both of N.C.

[73] Assignee: Dana Corporation, Toledo, Ohio

[21] Appl. No.: 742,849

[22] Filed: Nov. 1, 1996

[51] Int. Cl.[6] .............................. C12S 13/00; C12M 1/16
[52] U.S. Cl. ...................... 435/262.5; 435/264; 435/179; 435/810; 435/304.1
[58] Field of Search ................................ 435/262, 262.5, 435/264, 263, 271, 277, 281, 289.1, 304.1, 299.1, 810, 174, 177, 179, 244, 248–250, 260, 182; 134/22.1, 40; 206/205, 216, 225, 223

[56] References Cited

U.S. PATENT DOCUMENTS

| | | |
|---|---|---|
| 2,396,900 | 3/1946 | Taggart, Jr. . |
| 3,220,928 | 11/1965 | Brenner .................................... 435/264 |
| 3,347,297 | 10/1967 | Garland . |
| 3,532,599 | 10/1970 | Cooperman . |
| 3,843,517 | 10/1974 | McKinney et al. ..................... 435/281 |
| 4,111,813 | 9/1978 | Preus . |
| 4,446,236 | 5/1984 | Clyde . |
| 4,530,763 | 7/1985 | Clyde et al. . |
| 4,689,301 | 8/1987 | Adet et al. . |
| 4,988,443 | 1/1991 | Michaels et al. . |
| 5,344,557 | 9/1994 | Scanzillo . |
| 5,376,183 | 12/1994 | Gatt et al. . |
| 5,395,535 | 3/1995 | Pinckard . |
| 5,458,773 | 10/1995 | Holland . |
| 5,541,096 | 7/1996 | Nomura et al. . |
| 5,589,004 | 12/1996 | Lashmett et al. ........................ 435/264 |
| 5,716,840 | 2/1998 | Kahler et al. ............................ 435/264 |

FOREIGN PATENT DOCUMENTS

| | | |
|---|---|---|
| 0 255 354 | 2/1988 | European Pat. Off. . |
| 7-116514 | 5/1995 | Japan . |
| 2 159 834 | 12/1985 | United Kingdom . |
| 94/23802 | 10/1994 | WIPO . |

*Primary Examiner*—William H. Beisner
*Attorney, Agent, or Firm*—Millen, White, Zelano & Branigan, P.C.

[57] ABSTRACT

There is provided a method and apparatus for accelerating the decomposition of petroleum and petro-chemical based contaminants within expended filter media by exposing the contaminated filter media to an oxidizing medium which contains active ingredients for oxidizing the petroleum and petro-chemical based compounds, such as petroleum digesting bacteria, within a sealed container.

33 Claims, 5 Drawing Sheets

METHOD AND APPARATUS FOR ACCELERATED DECOMPOSITION OF PETROLEUM AND PETRO-CHEMICAL BASED COMPOUNDS WITHIN FILTER MEDIA

BACKGROUND OF THE INVENTION

Increased Federal, State and Local environmental regulations have produced an increased focus of environmental consciousness on a global level. The Environmental Protection Agency (EPA) along with the Occupational Safety and Health Administration (OSHA) have instituted increased and stringent regulations for the processing, manufacturing, utilization, and disposal of chemical compounds. For the purpose of this invention, the regulations of particular interest are those in the field of petroleum products, particularly those consisting of petroleum and petro-chemical based compounds (lubricating oils).

There are existing today numerous technologies for the reclamation and reprocessing of petroleum and petro-chemical compounds including the recovery of oil to be used in power stations and factories as an alternative source of fuel. When dealing with large volumes of these waste streams, there is a certain degree of technological and economic feasibility. One particular segment of this disposal market deals specifically with a variety of filtration components such as engine oil filter media and other filtration media utilized in automotive truck, marine and aircraft applications. These filtration media, when removed from the engine application, do represent petroleum and petro-chemical contaminated materials. These filtration media typically do not provide enough oil on a per unit basis to warrant a recycling activity and so pose a significant disposal problem. This problem is of particular importance in the face of increased environmental regulations which are imposed on large corporations.

SUMMARY OF THE INVENTION

One objective of the present invention is to provide a method for the safe disposal of oil contaminated filter media which meets or exceeds current environmental regulations for disposal of such contaminated materials and which also provides a positive environmental impact.

A further objective of the present invention is to provide an apparatus which will facilitate an accelerated and preferably natural biological decomposition of the petroleum products.

Upon further study of the specification and appended claims, further objects and advantages of this invention will become apparent to those skilled in the art.

The present invention provides methods and apparatus for accelerated decomposition of petroleum based compounds contained in expended oil filtration components, preferably by biochemical digestion.

In one aspect of the present invention, there is provided a digester which comprises an oxidizing medium capable of oxidizing the petroleum and petro-chemical based contaminants within the filter media, preferably to $CO_2$ and water, and a containment device suitable in size and dimensions to allow contaminated filter media and the oxidizing medium to be placed therein and sealed. Preferably, the sealed containment device prevents the escape of petroleum and petro-chemical based products and optionally the components of the oxidizing medium.

In another aspect of this invention, there is provided a kit from which a digester can be assembled which comprises an oxidizing medium as described above and a written protocol to insert the oxidizing medium within a containment device during use. These kits may optionally include the containment device.

In an additional aspect of this invention there is provided an oxidizing medium capable of oxidizing the petroleum and petro-chemical based compounds within contaminated filter media to $CO_2$ and water in the form of a container for said filter media.

In a further aspect of this invention, there is provided a method for decomposing petroleum and petro-chemical based compounds within filter media which comprises exposing the filter media to an oxidizing medium within a sealed container. The petroleum and petro-chemical based compounds are preferably neutralized by means of bio-chemical and biocatalytic digestion, particularly those initiated by photoreactive methods.

The apparatus and methods of this invention can use a variety of active ingredients for the oxidizing medium which decompose petroleum and petro-chemical based compounds to $CO_2$ and water. For example, bacteria conventionally known to digest petroleum compounds can be used as an active ingredient of the oxidizing medium. There are several forms of *bacillus* which can be successfully colonized upon filter media with petroleum contaminants. Catalytic enzymes which dehydrogenate petroleum and petro-chemical based compounds can also be used, as well as other conventional oxidizing catalysts and chemical reagents which react (oxidize) these contaminants. Examples of the suitable catalytic enzymes may be obtained from extractions of petroleum digesting bacteria. Bacteria which digest petroleum provide advantage in some instances in that colonization serves to increase the activity of the oxidizing medium allowing adjustment to the level of contaminants within the filter media. The petroleum and petro-chemical based compounds within contaminated oil filters are sometimes complex and, as such, combinations of bacteria with or without enzymes can be effective in providing full degradation of the compounds to $CO_2$ and water. An example is the combination of *bacillus, licehniformis* (BAS50) and pseudomonas denitrificans used together with a dehydrogenase enzyme that serves as a catalyst for the removal of hydrogen atoms to assist in the decomposition and digestion of the petroleum compounds by the bacterium. The amount of active ingredient used within the oxidizing medium is dependent on the type deployed and the level of contamination in the filter media.

The active ingredient is used with a carrier such as a solid substrate or liquid to complete the oxidizing media. The use of a cellulose material as a substrate for components of the oxidizing medium also helps provide a controlled environment. For example, where petroleum digesting bacteria are used as an active ingredient of the oxidizing medium, a protein food source for this specific oil digesting bacteria can be deposited on the substrate, enabling colonization upon the boundary of the substrate layers. In certain embodiments, the substrate of the oxidizing medium is integrated with the containment device. For example, the containment device can comprise multiple layers and include a cellulose material as a substrate for the active ingredient and other components of the oxidizing medium.

The containment device provides a controlled environment for the decomposition of the petroleum and petro-chemical based products within the contaminated filter media. The containment device used in this invention can vary significantly in size, dimensions and composition, as long as it allows for a contaminated filter medium to be placed inside and sealed with the oxidizing medium to prevent escape of the contaminants. The containment device may be of a size to accommodate more than one filter element, if desired. The containment device may be as simple as a fusable film that can be assembled to seal the contaminated filter and oxidizing medium therein. A preferred configuration is a transparent bag which can be sealed at the open end. The material which forms the films and bags is preferably comprised of polyurethane or similar transparent synthetic material resistant to the oxidizing medium. The containment device preferably can be recycled or is biodegradable.

Where the active ingredient within the oxidizing medium includes a bacterium, the rate and extent of decomposition by the type of bacterium that is deployed for digestion of the petroleum compounds are, of course, important selection criteria; however, it is also desirable that the bacteria used can lie in a dormant or semi-starved state until they are employed and required for complete digestion of petroleum material. The oxidizing medium typically contains a sufficient food source to sustain life of the bacterium for at least 30 days but must also cause them to remain at a repressed level of activity; thus, it is concluded that there will be a limited shelf life for some embodiments of the apparatus of this invention.

Also of particular importance is the reactivation or resuscitation of the dormant bacteria. In certain embodiments, this is accomplished by providing a layer of titanium dioxide. The titanium dioxide is extremely photosensitive and, therefore, readily reacts in the presence of sunlight. Photon energy adsorbed onto the titanium dioxide layer induces oxygen to attach to the oil or petroleum based materials which facilitates and accelerates the oxidation of the oil compounds. Dormant oxidizing media typically must be housed inside of a polyurethane or other polymer film or bag that is sealable and sufficiently sealed to prevent the introduction of moisture or oxygen present in ambient air so as to remain dormant. Additionally, where a photoinitiator is present, the polyurethane liner must be constructed of an opaque material to prevent premature photoactivation and, as in the case of $TiO_2$ initiators, subsequent oxygenation of the substrate. Without this opaque shielding, premature photoactivation would result in untimely resuscitation of dormant bacterium upon the boundaries of the substrate. Without petroleum compounds available, sustainable life of the bacterium and subsequent digestion and biomass generation of the bacterium within the containment device cannot occur.

In embodiments which employ bacterium on a substrate layer as the oxidizing medium, it is preferable to treat the substrate with the following components: a biosurfactant, glucose, a $NaNO_3$ solution and a NaCl solution. Such biofilms can actively function and be sustained in environments where the pH is between 4.6 to 9.0. In preferred embodiments, the substrate is treated with sufficient amounts of active ingredients to form a biosphere environment capable of sustaining the bacteria in a repressive state which can be enzymatically resuscitated by photocatalytic means.

Dormant bacteria are preferably cultured onto the substrate at a rate of between 1,500 and 2,100 colony count per $cm^2$. It should be noted that this is the initial bacterium implant count not the colony count of the bacterium after the induction of a contaminated filter. The growth count is dependent on the amount of the petroleum and petro-chemical based compound introduced into the containment device as well as the pH of the petroleum and petro-chemical based compound at the time of introduction. In the case of activation by photoinitiation, the magnitude and the duration of the photon energy applied to the photoinitiator will also affect the growth rate.

FIG. 1 illustrates a digester 10 of the present invention in operation with a filter (A) placed inside. The cut-away shows petroleum contaminated filter media (B) therein. Filter (A) and the filter media (B) are not part of digester 10. The containment device 5 of digester 10 is a transparent bag which is sealed by seal 20. Containment device 5 is comprised of material which prevents escape of petroleum and petro-chemical based products and also the oxidizing medium as discussed above.

The oxidizing medium 25 of digester 10 is in the form of a flat substrate, preferably with a thickness of about 1 mm. Such oxidizing media are typically prepared by treatment of a cellulose substrate 50 as shown in FIG. 5 with an aqueous solution consisting of glucose (about 5%). This solution may be mechanically applied through means of mechanically spraying or dipping the substrate into the solution. The glucose solution is allowed to dry typically at 50° C. for a period of between ten to twelve minutes after which substrate 50 typically is further coated with a second layer of a solution containing 0.2% $NaNO_3$ by the method and means previously mentioned for the glucose coating. After the second coating, substrate 50 is typically dried under the conditions previously mentioned for the glucose coating. Typically, a third coating is also applied from an aqueous solution containing 5% NaCl in the same manner as the glucose and $NaNO_3$ coatings. It is desirable to obtain a pH factor on such a substrate of between 4.8 and 5.2. Bacteria colonies typically can now be applied to the surface of substrate 50, preferably in an amount sufficient to obtain a colony count of between 1,500 and 2,100 colonies per $cm^2$. The final preparatory step for oxidizing medium 25 is to apply an aqueous slurry comprised of 5–8% of titanium dioxide ($TiO_2$) to substrate 50 which serves as a photoreactant to impart oxygen to the petroleum compound once it is introduced into the containment device. This oxidizing medium 25 is shown in FIG. 6. An oxidizing medium 25 which is further processed to form a container for the filter media is shown in FIG. 7.

There is provided by the invention an oxidizing medium 125 in the form of a container for the contaminated filter media as shown in FIG. 2 which can house the contaminated filter media as shown in FIG. 3. A container suitable for enclosing a conventional filter element for an automobile can be prepared from a fiber substrate treated as described above having dimensions of 60 cm×30 cm with a layer thickness of about 1 mm. Each seam 135 of this bag is preferably stitched or sewn leaving one opening with which to insert a filter element. Glues and/or adhesives are not recommended as they tend to be attacked by the cultured bacterium.

FIG. 3 illustrates another digester 100 of this invention. Digester 100 employs oxidizing medium 125, shown cut away to illustrate filter element (C) which is not part of digester 100. Oxidizing medium 125 is within containment device 110, which is comprised of a transparent material in the shape of a bag sealed by seal 120.

The oxidizing media 25 and 125 of digesters 10 and 100 of FIGS. 1 and 3 are photoinitiated. To maintain a photo-initiated oxidizing medium dormant for extended periods, it is preferably stored in a sealed opaque photoresistant container under environmental conditions consisting of 21°–25°

C. in temperature and preferably in a low light area until use. Oxidizing media which are not photoinitiated or need not be maintained dormant, do not require this container. While oxidizing media in the form of solid substrates are preferred, the apparatus and method of this invention do encompass the use of oxidizing media in liquid form such as bacteria within a liquid medium.

To use the digesters of this invention, the oxidizing medium is inserted into the containment device. Included within the apparatus of this invention are kits 300, shown in FIG. 4, for assembling the digester. These kits comprise an oxidizing medium 325 and a written protocol 301 indicating the oxidizing medium 325 should be inserted in a containment device. The containment device is optionally included within the kit. Kit 300 of FIG. 4 includes containment device 310. The components of these kits may be separately packaged, transported and/or stored. The digesters of the present invention may be preassembled with the oxidizing medium incorporated in the containment device in advance and the two packaged together or the oxidizing medium and containment device may be integrated into one component.

The method of this invention comprises exposing filter media having petroleum and petro-chemical based compounds to an oxidizing medium within a sealed container with an active ingredient selected from petroleum digesting bacteria, catalytic enzymes for dehydrogenating hydrocarbons or combinations thereof, which oxidizes the petroleum and petro-chemical based compounds within said filter media to $CO_2$ and water. Typically, an expended filter is inserted into a containment device and exposed to the oxidizing medium. Where the oxidizing medium is in the form of a container, the expended filter is placed therein. It may be necessary to disperse any residual oil contained in the expended filter by agitation. Petroleum digestion commences upon contact or exposure of the contaminants to the bacterium. Where the oxidizing medium is dormant prior to exposure to the filter media, the method includes the additional step of activating the oxidizing medium. Where the oxidizing medium contains a photoinitiator, it is activated by exposure to sunlight. Indoor lighting provides sufficient photon energy to activate the oxidizing medium where the photoreactive compound is titanium oxide. Activating the dormant oxidizing medium accelerates decomposition. Photoinitiation of dormant bacteria will initiate oxygenation within the containment device and resuscitate the previously dormant petroleum digesting bacteria. Preferably, the environment within the sealed container will enable growth of the petroleum digesting bacteria, this can be accomplished by continued exposure to light where $O_2$ is produced.

The byproducts of this treatment produce carbon dioxide ($CO_2$) and water vapor ($H_2O$). The production of water vapor and the production of $O_2$ from the photochemical reaction provide a highly productive environment in which bacteria can actively reproduce and multiply. These biochemical reactions and reproduction cycles preferably continue until the containment device approaches equilibrium meaning that all of the petroleum products and nutrients have been digested and decomposed by the bacteria and there is no longer a sufficient food source to sustain life of the petroleum digesting bacteria.

This process can decompose petroleum without any hazardous by-products. When an oxidizing medium in the form of a bag or flat substrate is used, the remaining material of the oxidizing medium is preferably comprised of a biodegradable material such as cellulose. In preferred embodiments, the filter media is digested as well with the only material remaining being the metal housing and seals of the original oil filter device and any photo-oxygenation media ($TiO_2$).

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

Figure 1:
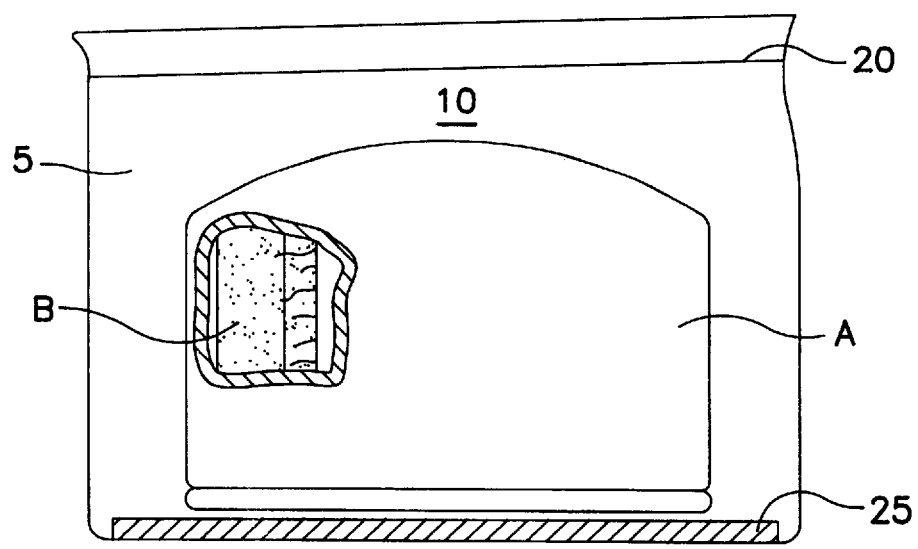
FIG. 1 illustrates a digester of the present invention for decomposing petroleum and petro-chemical based contaminants within filter media, in operation.
Figure 2:
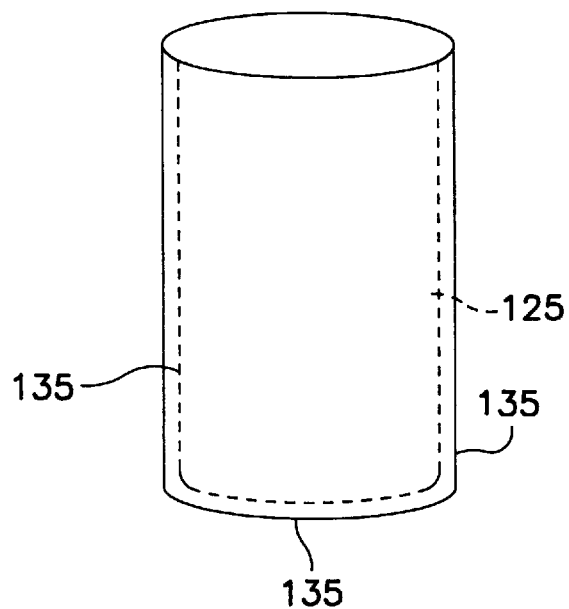
FIG. 2 illustrates an oxidizing medium of the present invention in the form of a container for filter media.
Figure 3:
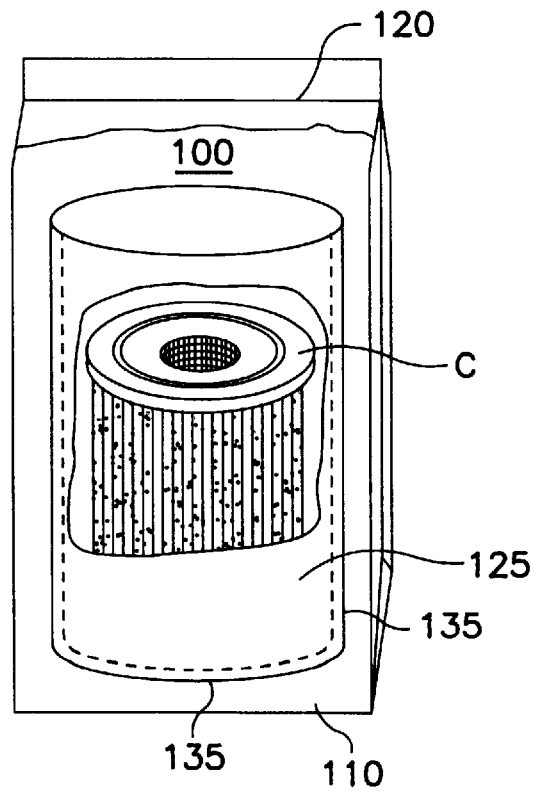
FIG. 3 illustrates another digester of the present invention in operation.
Figure 4:
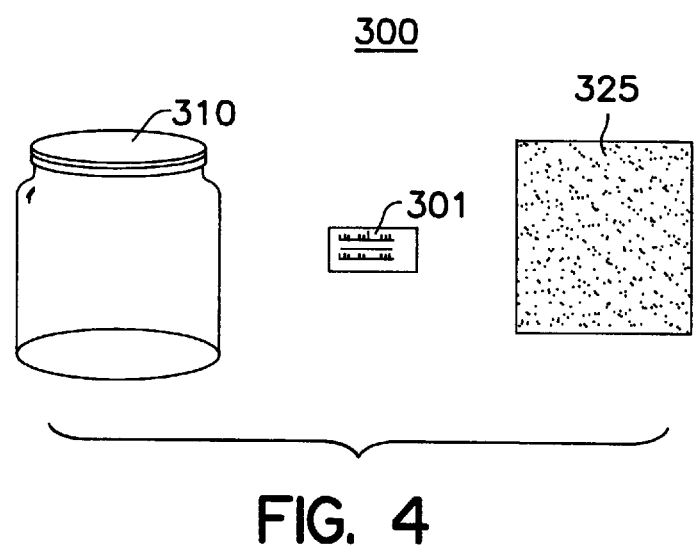
FIG. 4 illustrates a kit of the present invention for preparing a digester.
Figure 5:
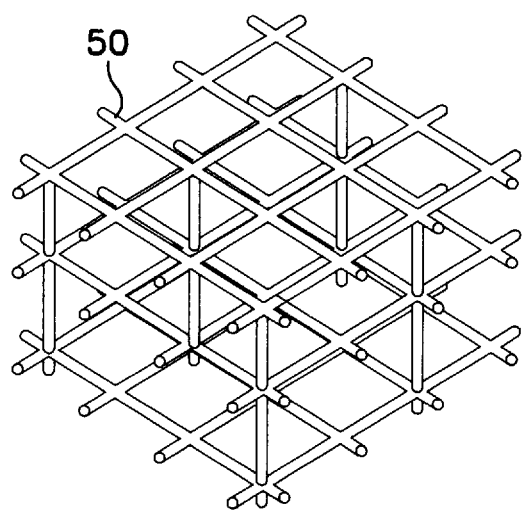
FIG. 5 is a magnified illustration of a section of a substrate from which an oxidizing medium is formed.
Figure 6:
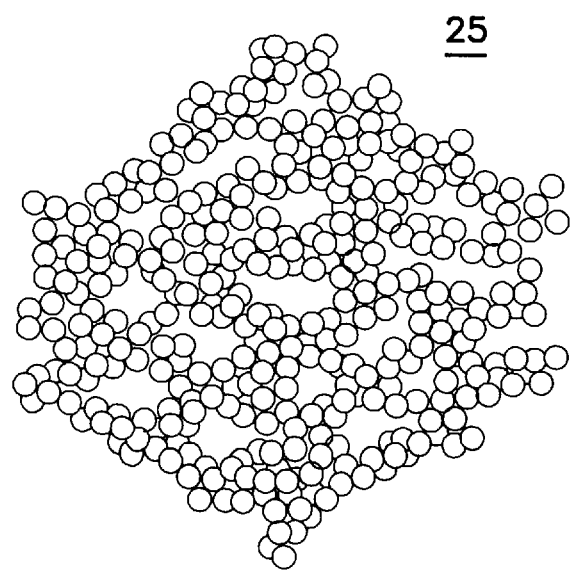
FIG. 6 is a magnified illustration of a section of a completed oxidizing medium for a digester of the present invention formed from the substrate of FIG. 5.
Figure 7:
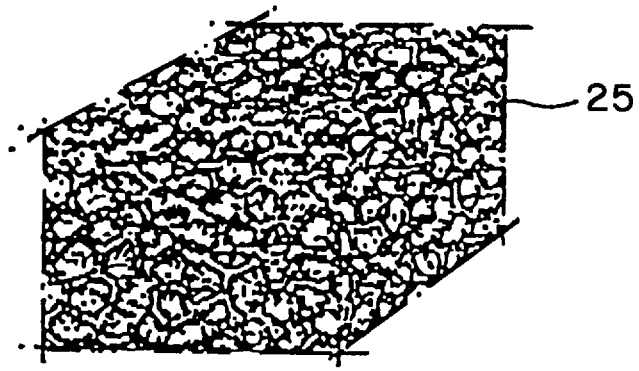
FIG. 7 is a magnified illustration of an oxidizing medium of the present invention that is formed into a container for filter media from the oxidizing medium of FIG. 6.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A digester for accelerating the decomposition of petroleum and petro-chemical based contaminants within filter media comprising an oxidizing medium capable of oxidizing the petroleum and petro-chemical based contaminants within said filter media, said oxidizing medium being positioned within a containment device of a size and dimensions which allow the contaminated filter media and oxidizing medium to be placed therein and sealed so as to prevent the escape of the petroleum and petro-chemical based contaminants, wherein the oxidizing medium comprises an active ingredient selected from the group consisting of petroleum digesting bacteria, catalytic enzymes and combinations thereof.

2. A digester as in claim 1, wherein the oxidizing medium is capable of oxidizing the petroleum and petro-chemical based contaminants to $CO_2$ and water.

3. A digester as in claim 1, wherein the containment device comprises a transparent film or transparent bag which enables the oxidizing medium therein to be exposed to light.

4. A digester as in claim 1, wherein the oxidizing medium and the containment device are integrated into a single unit.

5. A digester as in claim 1, wherein the oxidizing medium is dormant before placement of said contaminated filter media within the containment device and additionally comprises initiators which can activate the oxidizing medium and accelerate the decomposition of petroleum and petro-chemical based contaminants after placement of said contaminated filter media within the containment device.

6. A digester as in claim 5, wherein the initiators within said oxidizing medium are photoinitiators which activate the oxidizing medium by exposure to light.

7. A digester as in claim 1, wherein the oxidizing medium additionally contains additives to sustain the petroleum digesting bacteria in a dormant state.

8. A digester as in claim 7, wherein the oxidizing medium additionally contains a photoinitiator which activates the dormant petroleum digesting bacteria.

9. A digester as in claim 8, wherein the oxidizing medium is packaged in an opaque container until use.

10. A digester as in claim 1, wherein the oxidizing medium additionally contains additives to enhance the growth of the petroleum digesting bacteria within said containment device.

11. A digester as in claim 1, wherein the oxidizing medium additionally comprises a solid substrate with said active ingredient deposited thereon, said substrate being in a form of a container for said filter media.

12. A digester as in claim 1, wherein the oxidizing medium contains additives which decompose the filter media.

13. A digester for accelerating the decomposition of petroleum and petro-chemical based contaminants within filter media which comprises:
   a) a petroleum digesting bacteria which oxidizes the petroleum and petro-chemical based containments within said filter media to carbon dioxide and water; and
   b) a transparent containment device of a size and dimensions which allow the contaminated filter media and petroleum digesting bacteria to be placed inside and sealed to prevent the escape of petroleum and petro-chemical based compounds, wherein said petroleum digesting bacteria is positioned within said transparent containment device.

14. A digester as in claim 13, wherein the petroleum digesting bacteria is deposited on a solid substrate.

15. An oxidizing medium capable of decomposing petroleum and petro-chemical based contaminants within filter media which comprises a substrate in the form of a container for said filter media with an active ingredient deposited thereon selected from the group consisting of petroleum digesting bacteria, catalytic enzymes and combinations thereof.

16. An oxidizing medium as in claim 15, wherein the active ingredients include dormant petroleum digesting bacteria and said oxidizing medium additionally contains additives to sustain said petroleum digesting bacteria and initiators to resuscitate said petroleum digesting bacteria.

17. A method for decomposing petroleum and petro-chemical based compounds within filter media which comprises exposing filter media with petroleum and petro-chemical based contaminants to an oxidizing medium within a sealed container, said oxidizing medium having an active ingredient selected from the group consisting of petroleum digesting bacteria, catalytic enzymes and combinations thereof, which oxidizes the petroleum and petro-chemical based contaminants within the filter media to $CO_2$ and water.

18. A method as in claim 17, wherein the oxidizing medium employed is dormant prior to exposure to said filter media and said method includes the additional step of activating the oxidizing medium.

19. A method as in claim 18, wherein the step of activating the oxidizing media comprises exposing the oxidizing medium to light.

20. A method as in claim 17, wherein the oxidizing medium comprises a petroleum digesting bacteria and said method comprises the additional step of controlling the environment within said sealed container to enable growth of said petroleum digesting bacteria therein after exposure to said filter media.

21. A method as in claim 20, where the sealed container is transparent and the oxidizing medium contains a photoinitiator, and said method comprises the additional step of exposing the sealed container to light sufficient to generate oxygen therein from the photoinitiator for the growth of the petroleum digesting bacteria.

22. A kit for assembling a digester which accelerates the decomposition of petroleum and petro-chemical based contaminants on filter media which comprises: an oxidizing medium capable of oxidizing said petroleum and petro-chemical based contaminants within said filter media and a written protocol to insert said oxidizing medium into a containment device of a size and dimensions which allow the contaminated filter media and oxidizing medium to be placed therein and sealed so as to prevent the escape of the petroleum and petro-chemical based contaminant, wherein the oxidizing medium comprises an active ingredient selected from the group consisting of petroleum digesting bacteria, catalytic enzymes and combinations thereof.

23. A kit as in claim 22, wherein the oxidizing medium is capable of oxidizing the petroleum and petro-chemical based contaminants to $CO_2$ and water.

24. A kit as in claim 22, wherein the oxidizing medium is dormant before placement of said contaminated filter media within the containment device and additionally comprises initiators which can activate the oxidizing medium and accelerate the decomposition of petroleum and petro-chemical based contaminants after placement of said contaminated filter media within the containment device.

25. A kit as in claim 24, wherein the initiators within said oxidizing medium are photoinitiators which activate the oxidizing medium by exposure to light.

26. A kit as in claim 22, wherein the oxidizing medium is comprised of an active ingredient selected from the group consisting of petroleum digesting bacteria, catalytic enzymes and combinations thereof.

27. A kit as in claim 26, wherein the oxidizing medium additionally contains additives to sustain the petroleum digesting bacteria in a dormant state.

28. A kit as in claim 26, wherein the oxidizing medium additionally contains additives to enhance the growth of the petroleum digesting bacteria within said containment device.

29. A kit as in claim 27, wherein the oxidizing medium additionally contains a photoinitiator which activates the dormant petroleum digesting bacteria.

30. A kit as in claim 22, wherein the oxidizing medium comprises a solid substrate, with an active ingredient deposited thereon, in the form of a container for said filter media.

31. A kit as in claim 22 which additionally comprises said containment device.

32. A kit as in claim 31, wherein the containment device comprises a transparent film or transparent bag which enables the oxidizing medium therein to be exposed to light.

33. An oxidizing medium capable of decomposing petroleum and petro-chemical based contaminants within media filter which comprises a substrate in the form of a container for said filter media with an active ingredient deposited thereon selected from the group consisting of petroleum digesting bacteria, catalytic enzymes and combinations thereof, and titanium dioxide initiators to resuscitate said petroleum digesting bacteria.

* * * * *